Nov. 18, 1924.
F. PARDEE
1,515,965
AIR SPIRAL
Filed Oct. 25, 1922     2 Sheets-Sheet 2
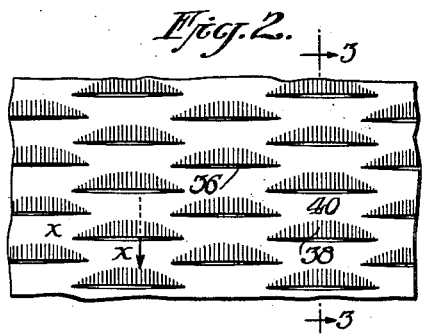
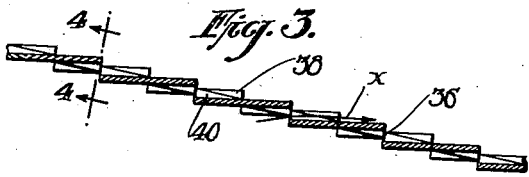
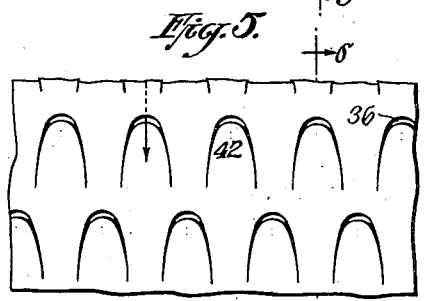
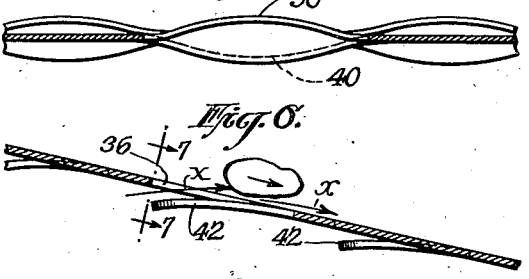
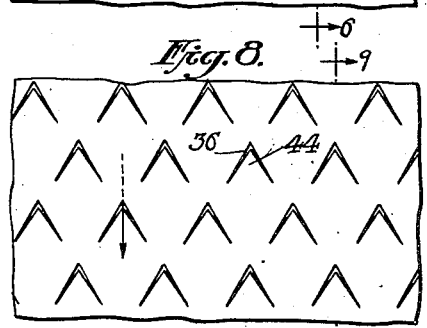
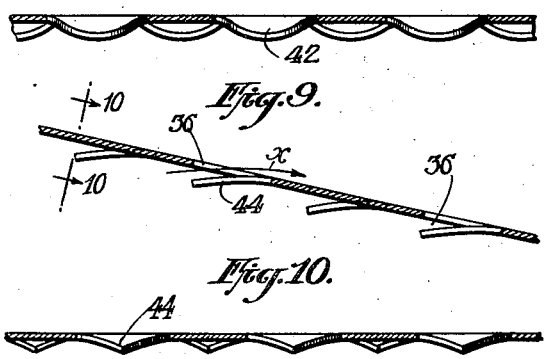
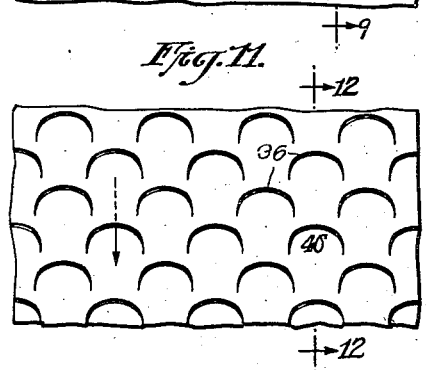
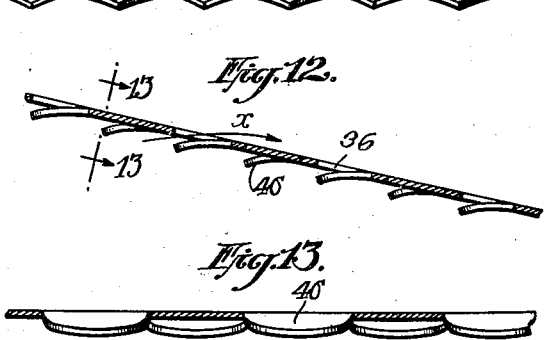
INVENTOR
FRANK PARDEE.
BY
ATTORNEY Patented Nov. 18, 1924.

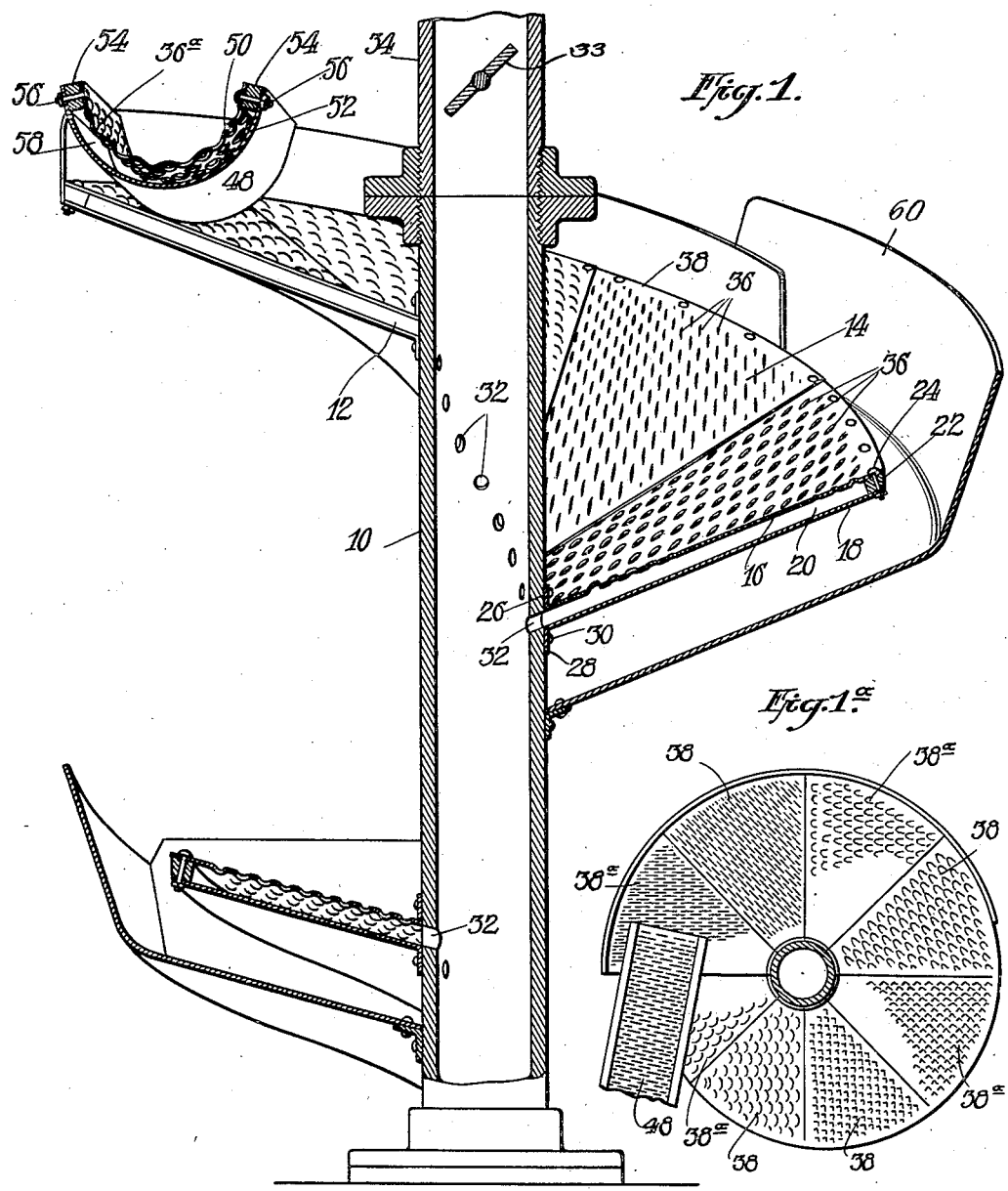

1,515,965

UNITED STATES PATENT OFFICE.

FRANK PARDEE, OF HAZLETON, PENNSYLVANIA.

AIR SPIRAL.

Application filed October 25, 1922. Serial No. 596,707.

*To all whom it may concern:*

Be it known that I, FRANK PARDEE, a citizen of the United States, and resident of Hazleton, Pennsylvania, have invented certain new and useful Improvements in Air Spirals, of which the following is a specification.

This invention relates to spiral separators for separating slate and other impurities from coal. In a co-pending application filed March 28, 1922, Serial Number 547,451 I have disclosed means for utilizing fluid pressure to assist in the separation of materials being handled on the separator.

My present invention is a continuation in part of and an improvement on the invention described in said application.

An embodiment of the invention is illustrated in the accompanying drawings in which—

Fig. 1 is a vertical longitudinal section;

Fig. 1ª is a plan of a separator runway showing different segments or jackets having differently formed outlet ports;

Fig. 2 is an enlarged detail plan of a portion of a segment showing one type of outlet ports;

Fig. 3 is a section on line 3—3 of Fig. 2;

Fig. 4 is a section on line 4—4 of Fig. 3;

Fig. 5 is a view showing an alternative port construction;

Fig. 6 is a section on line 6—6 of Fig. 5;

Fig. 7 is a section on line 7—7 of Fig. 6;

Figs. 8, 9 and 10 illustrate another form of port, Fig. 9 being a section on line 9—9 of Fig. 8 and Fig. 10 being a section on line 10—10 of Fig. 9;

Figs. 11, 12 and 13 show another form of port construction, Figs. 12 and 13 being sections on the correspondingly numbered lines of Figs. 11 and 12 looking in the direction of the arrows.

Referring to the drawings the separator includes an upright supporting column 10 to which is secured a plurality of outwardly extending rods 12 for supporting the runway designated as a whole by numeral 14. The runway could be supported in several different ways and the invention is not limited to use with any particular type of supporting structure.

The runway comprises an upper wall or floor 16 over which the material travels and a lower wall 18 which is spaced away therefrom to form a chamber 20. This chamber is closed at the outer edge by a spiral rod or bar 22 to which the plates forming the walls of the runway are secured by bolts 24. The plates forming the walls 16 and 18 are formed with flanges 26 and 28 through which pass suitable screws or bolts 30 to secure them to the central column 10.

The column 10 is hollow and is formed with a series of ports 32 which open into the chamber 20. Air or other suitable fluid is supplied to the column 10 by a pipe 34 which leads to a suitable fan, pump or fluid supply, not shown. The fluid thus supplied escapes through a multiplicity of ports 36 formed in the segmental plates or jackets 38 which form the upper wall 16 of the runway.

The entire area of each segmental plate 38 may be perforated as in Fig. 1 to form a multiplicity of ports for the escape of fluid, or as shown in Fig. 1ª some of the plates 38ª may be perforated at certain areas and imperforate at other areas.

In my co-pending application above referred to the segmental plates or jackets of the separator are corrugated to form ports for the escape of fluid at the line where the plates overlap. In the present case the ports discharge the fluid over a much greater area and the ports are formed by punching projections from the body of the plate to perforate the same. The projections form part of the port and serve to control the direction in which the jet issues from the chamber 20.

In Figs. 2 to 13 inclusive, I have shown various alternative forms of plates having ports constructed to direct the jet of air or other fluid in a determined direction.

Figs. 2, 3 and 4 show a portion of a segmental plate in which the ports 36 are formed by stamping the metal to form a plurality of crests 38 and indentations 40 thus forming a recticulated surface for the material to travel over. The ports formed in this way will direct the jets of fluid so that they are discharged substantially in the direction indicated by the arrows $x$ in Figs. 2 and 3 and 6. The jets of fluid, it is seen, are discharged along the surface of the plates and exert a pushing action on the material instead of escaping perpendicularly and merely exerting a lifting action as said jets would do if the ports were simple perpendicular holes punched or drilled through the plates.

In Figs. 5, 6 and 7 the ports 36 are formed by punching elongated tongues or projections 42 from the surface of the plates so that they extend beyond the surface of the imperforate part of the plate. These tongues form part of the ports and serve to restrict the outlet areas of the port orifices and also to control the direction in which the jets issue from the chamber 20 as will be understood.

Figs. 8, 9 and 10 show ports having tongues 44 which are pointed and punched to project beyond one surface of the plate to form a substantially triangular port orifice to direct the jets discharged from the chamber.

Figs. 11 to 13 inclusive show a plate having ports formed by stamping short rounded tongues 46 so that they project below the surface of the plate.

The runway can be made of a series of plates all having ports of the same sort, or segmental plates having different ports such as those shown in Figs. 2 to 13 can be used in different combinations. The plates can be inverted if desired so that the projections forming part of the ports will extend above the surface of the runway so as to exert a friction on the material traveling thereon. As indicated in Fig. 1ª the runway is made up of plates having the several different types of ports shown in Figs. 2 to 13, the plates 38 being perforated throughout their entire area and the plates 38ª having outlet ports formed only in part of the surfaces thereof. The plates used will be determined by the class of coal or other material handled and I do not limit myself to any particular type or combination of the types of ports shown.

For feeding the coal and slate or other materials to the separator I employ an inclined chute 48, of hollow construction having an upper wall 50 with ports 36ª formed therein of any of the above described types. A lower wall 52 is spaced away from the wall 50 by side bars 54 which are secured to said walls by bolts 56 as shown. This construction forms a chamber 58 which is supplied with air or other fluid. The discharge of the fluid from the ports 36ª of the chute makes it possible to accelerate the travel of the material over the same and also provides a simple expedient for regulating the rate of flow of different classes of material and compensating for the variation in the friction exerted by the material due to atmospheric or weather conditions.

In operation the mixture of coal and slate is dumped into a suitable hopper or bin and the chute 50 conveys and discharges it to the upper end of the runway 14 of the spiral separator. Coal has a hard glass-like crystalline surface, and slate and other impurities are dull and exert more friction when traveling down the runway. Due to these characteristics the coal has a tendency to travel faster than the slate and centrifugal force aids in causing the coal to travel in an outer path on the runway, while the slate follows an inner path nearer the axis of the separator.

As the mixture of coal and slate leaves the chute 50, it falls on the upper end of the runway and is there subjected to the pressure of the fluid issuing from the ports formed therein. The jets of air or other fluid tend to lift and push the coal which is comparatively lighter than the slate and augments the centrifugal action of the spiral separator. The purer coal flies off and is caught by a suitable conveyor thread 60 supported in juxtaposition to the runway. This thread 60 discharges the coal to a suitable chute or storage bin, not shown. Pure coal also is discharged from the lower end of the outer or peripheral zone of the runway and this too is led by a suitable chute to a storage bin or pile, not shown. The slate and other impurities being heavier and duller exert a greater friction on the runway and are not affected by the fluid to the same degree as the lighter coal, and they fall toward the inner or central part of the runway and such refuse is discharged at the lower end to a waste pile, not shown.

My improved spiral separator having means for exerting fluid pressure on the material possesses all the known advantages of the usual spiral separator and the added advantage that the work can be done in less time, and the apparatus requires less vertical space or "head room" than former types of spiral separators. The plates having the improved port constructions above described provide means for directing the jets of air in the most advantageous direction, and suitable styles of ports shown can be selected for treating different classes of material and the volume or pressure of the fluid discharged can be varied according to the material handled or to compensate for changes in weather conditions which affects the manner in which the material travels on the separator.

The plates having a multiplicity of ports permits of an even distribution of fluid pressure along the runway and makes it possible to utilize a great number of jets to act continuously on the material to be separated. Accurate and delicate adjustment of the fluid can be secured by using plates having different size ports or by bending the projections forming part of said ports to restrict the outlet areas more or less as required. In some cases the plates can be used to exert friction by assembling them so that the port projections extend upwardly and form part of the runway surface.

The pressure, velocity or volume of the fluid discharged from the runway can be varied by increasing or decreasing the size of the port openings as herein disclosed. Or the speed of the fan or blowing engine can be varied or the fluid supply can be controlled by a valve such as shown diagrammatically at 33 in Fig. 1 to increase or decrease the force exerted on the material traveling on the spiral floor.

While I have described with great particularity the details of the embodiment of the invention herein shown, it is not to be construed that I am restricted to such construction. Various changes in arrangement and substitution of equivalents may be made by those skilled in the art without departure from the invention as defined in the appended claims.

What I claim is:

1. A separator having a spiral runway comprising a series of perforated plates and means for discharging a fluid through the perforations in the plates to assist in the separation of the material traveling on the runway.

2. A separator having a spiral runway which is perforated to permit the discharge of a fluid along the runway to assist in the separation of the material traveling thereon.

3. A separator having a spiral runway formed of upper and lower plates spaced apart to form a spiral chamber, ports formed in the surface of the upper plates and means for supplying a fluid to said chamber.

4. A spiral separator having a runway formed with walls spaced apart to form a chamber to convey a fluid, one of said walls being reticulated to present a frictional surface to the material traveling on the runway and also permit the discharge of fluid from said chamber to assist in the separation of material traveling along the runway.

5. A spiral separator having a runway with walls spaced apart to form a chamber, means for supplying a fluid to said chamber and a multiplicity of ports formed in the upper wall of the runway adapted to direct the flow of fluid from said chamber.

6. A spiral separator having a runway with walls spaced apart to form a chamber, means for supplying a fluid to said chamber the upper wall of said runway being formed of a series of segmental plates having portions punched to form outlet ports to direct the flow of fluid from said chamber.

7. In a spiral separator having a chambered runway for supplying a fluid to assist in the separation of the material being treated, a discharge port construction comprising a plate having a multiplicity of portions punched to offset certain areas with respect to other areas to form a multiplicity of openings through which the fluid can be discharged in jets.

8. A spiral separator having a runway with walls spaced apart to form a chamber, means for supplying a fluid to said chamber, the upper wall of said runway having a multiplicity of surface indentations forming ports through which the fluid is adapted to be discharged in a direction determined by the location and shape of the indentations.

9. A spiral separator having a runway with walls spaced apart to form a chamber, means for supplying a fluid to said chamber, the upper wall of said runway having projections punched therefrom to form ports adapted to control the direction of the jets issuing from the chamber.

10. A spiral separator having a runway with walls spaced apart to form a chamber, means for supplying a fluid to said chamber, the upper wall of said runway comprising a series of segmental plates each having a multiplicity of ports formed therein, each of said ports including a projection extending into said chamber and forming a deflector adapted to direct the jet of fluid discharged from the port in a predetermined direction.

11. In a spiral separator provided with means for discharging a fluid from the runway thereof, means for varying the pressure, velocity or volume of said fluid so as to vary the force exerted on the material traveling on the runway.

In witness whereof, I have hereunto signed my name.

FRANK PARDEE.